United States Patent
Oh et al.

(10) Patent No.: US 11,479,640 B2
(45) Date of Patent: Oct. 25, 2022

(54) BIO-BASED POLYCARBONATE ESTER RESIN FOR EYEGLASS FRAME

(71) Applicant: SK CHEMICALS CO., LTD., Seongnam-si (KR)

(72) Inventors: Kwang Sei Oh, Seongnam-si (KR); Jong-In Lee, Seongnam-si (KR)

(73) Assignee: SK CHEMICALS CO., LTD., Seongnam-si (KR)

(*) Notice: Subject to any disclaimer, the term of this patent is extended or adjusted under 35 U.S.C. 154(b) by 54 days.

(21) Appl. No.: 17/253,166

(22) PCT Filed: Jul. 2, 2019

(86) PCT No.: PCT/KR2019/008053
§ 371 (c)(1),
(2) Date: Dec. 17, 2020

(87) PCT Pub. No.: WO2020/013507
PCT Pub. Date: Jan. 16, 2020

(65) Prior Publication Data
US 2021/0301081 A1    Sep. 30, 2021

(30) Foreign Application Priority Data

Jul. 12, 2018  (KR) .................. 10-2018-0080989

(51) Int. Cl.
| | | |
|---|---|---|
| *C08G 63/183* | (2006.01) | |
| *C08G 64/02* | (2006.01) | |
| *C08G 63/185* | (2006.01) | |
| *C08G 63/64* | (2006.01) | |
| *C08G 64/30* | (2006.01) | |
| *G02C 5/00* | (2006.01) | |

(52) U.S. Cl.
CPC ....... *C08G 64/0208* (2013.01); *C08G 63/183* (2013.01); *C08G 63/185* (2013.01); *C08G 63/64* (2013.01); *C08G 64/30* (2013.01); *G02C 5/008* (2013.01)

(58) Field of Classification Search
USPC ............................ 528/196, 198, 298, 370
See application file for complete search history.

(56) References Cited

U.S. PATENT DOCUMENTS

2004/0092703 A1    5/2004  Germroth et al.

FOREIGN PATENT DOCUMENTS

| CN | 104031249 A | | 9/2014 | |
| CN | 106800643 A | | 6/2017 | |
| CN | 106800643 B | * | 8/2019 | ............. C08G 63/42 |
| KR | 10-2015-0012152 A | | 2/2015 | |
| KR | 10-2016-0090703 A | | 8/2016 | |
| WO | 2015/034285 A1 | | 3/2015 | |
| WO | 2018/056754 A1 | | 3/2018 | |

OTHER PUBLICATIONS

CN106800643B machine translation; A Preparation Method of High-Fire Resistance Isobide Type Atatic Polyester Li et al. (Year: 2019).*
Long Feng, et al., "A designed synthetic strategy toward poly(isosorbide terephthalate) copolymers: a combination of temporary modification, transesterification, cyclization and polycondensation", Polymer Chemistry, The Royal Society of Chemistry, 2015, pp. 7470-7479, vol. 6, No. 42.
Long Feng, et al., "A high-molecular-weight and high-Tg poly(estercarbonate) partially based on isosorbide: synthesis and structure-property relationships", Polymer Chemistry, The Royal Society of Chemistry, 2015, pp. 633-642, vol. 6, No. 4.
International Searching Authority, International Search Report for PCT/KR2019/008053 dated Oct. 11, 2019 (PCT/ISA/210).

* cited by examiner

*Primary Examiner* — Terressa Boykin
(74) *Attorney, Agent, or Firm* — Sughrue Mion, PLLC

(57) ABSTRACT

A bio-based polycarbonate ester resin is environment friendly by not containing a bisphenol, and exhibits excellent heat resistance, transparency, strength, hardness, dimensional stability and chemical resistance. Thus, the bio-based polycarbonate ester resin is suitable for use in an eyeglass frame. In addition, various colors may be painted and coated on during post-processing, a separate additive is not required during a molding process, and processing is undergone at a temperature lower than that for conventional plastic materials for an eyeglass frame, and thus manufacturing costs may be reduced.

16 Claims, No Drawings

BIO-BASED POLYCARBONATE ESTER RESIN FOR EYEGLASS FRAME

CROSS REFERENCE TO RELATED APPLICATIONS

This application is a National Stage of International Application No. PCT/KR2019/008053 filed Jul. 2, 2019 (expired), claiming priority based on Korean Patent Application No. 10-2018-0080989 filed Jul. 12, 2018.

TECHNICAL FIELD

The present invention relates to a bio-based polycarbonate ester resin for eyeglass frames, wherein the polycarbonate ester resin has a high bio-based carbon content and is excellent in heat resistance, transparency, strength, and hardness.

BACKGROUND ART

A bio-based polycarbonate ester resin prepared by melt polycondensation of 1,4:3,6-dianhydrohexitol with a carbonate, 1,4-cyclohexanedicarboxylate, or a terephthalate is a bioplastic that contains a bio-based monomer, that is, 1,4:3,6-dianhydrohexitol, derived from a bio-source. The bio-based polycarbonate ester resin has high transparency of poly(methyl methacrylate) (PMMA), which is a representative transparent general-purpose resin, and high heat resistance of bisphenol A (BPA) polycarbonate.

Meanwhile, in the field of eyeglass frames made of metals, plastics, and the like, there has recently been a growing interest in plastic materials that have such properties as functionality and body-friendliness and can be manufactured in various designs by virtue of excellent moldability and processability.

Typical plastic materials for eyeglass frames include petroleum-based materials such as Grilamid TR90 (EMS Grivory), Ultem 1000 (Sabic), and the like, and bioplastic materials derived from a bio-source such as Rilsan G850 (Arkema), Treva (Eastman Chemical Company), and the like.

Grilamid TR90, a typical injection molding-type polyamide material, can be coated in various colors after molding. In addition, it is lightweight due to its low specific gravity and is excellent in mechanical properties in terms of high elasticity and high flexural strength, but it has a disadvantage that its post-processing is prolonged due to its poor characteristics for painting and coating.

Ultem 1000, a polyetherimide material, is excellent in elasticity, which makes it possible to fabricate thin eyeglass frames. However, it is difficult to implement various colors due to its poor color and transparency, it is easily broken because of its low impact strength, and it is difficult to process due to its high processing temperature.

Rilsan G850 and Treva, bioplastic materials derived from a bio-source, are body-friendly, so that they are more suitable for skin contact. Specifically, Rilsan G850 has similar physical properties and processability to those of Grilamid TR90, except that the bio-based carbon content is 49 to 51%. In addition, Treva that uses cellulose-based raw materials has a bio-based carbon content of 42 to 45%, but it has low heat resistance (i.e., a Tg of 120° C.) as compared with the petroleum-based plastic materials, which is disadvantageous to the application thereof to the post-processing for imparting various functionalities.

DISCLOSURE OF INVENTION

Technical Problem

Accordingly, the present invention aims to provide a bio-based polycarbonate ester resin, which is suitable for the manufacture of body-friendly eyeglass frames, wherein the polycarbonate ester resin is excellent in such physical properties as heat resistance, transparency, strength, hardness, dimensional stability, and chemical resistance, as well as excellent in moldability and processability.

Solution to Problem

In order to achieve the above object, the present invention provides a bio-based polycarbonate ester resin for eyeglass frames, which comprises a repeat unit 1 represented by the following Formula 1; and a repeat unit 2 represented by the following Formula 2, a repeat unit 3 represented by the following Formula 3, or both of them:

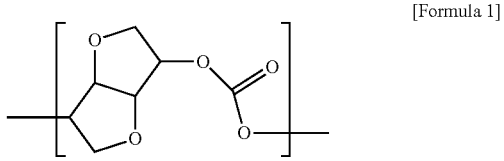

[Formula 1]

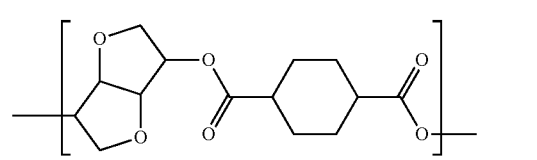

[Formula 2]

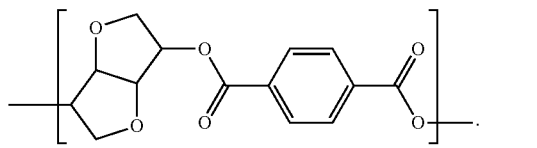

[Formula 3]

In order to achieve another object, the present invention provides a molded article prepared from the polycarbonate ester resin.

In order to achieve still another object, the present invention provides an eyeglass frame, which comprises the molded article.

Advantageous Effects of Invention

The bio-based polycarbonate ester resin for eyeglass frames of the present invention is environmentally friendly since it is free from bisphenols and is excellent in heat resistance, transparency, strength, hardness, dimensional stability, and chemical resistance. In addition, it is possible to paint and coat it in various colors in the post-processing, no separate additives are required in the molding process, and the production cost can be reduced since it is processed at low temperatures as compared with the conventional plastic materials for eyeglass frames.

BEST MODE FOR CARRYING OUT THE INVENTION

The present invention is not limited to the disclosures given below, but it may be modified into various forms as long as the gist of the invention is not changed.

Throughout the description of the embodiments, the term "comprise" means that other elements may be included unless otherwise indicated. In addition, all numbers expressing quantities of components, reaction conditions, and the like used herein are to be understood as being modified by the term "about" unless otherwise indicated.

Bio-Based Polycarbonate Ester Resin for Eyeglass Frames

The present invention provides a bio-based polycarbonate ester resin for eyeglass frames, which comprises a repeat unit 1 represented by the following Formula 1; and a repeat unit 2 represented by the following Formula 2, a repeat unit 3 represented by the following Formula 3, or both of them:

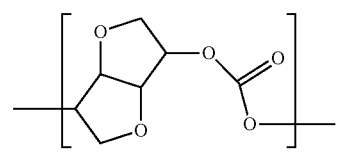
[Formula 1]

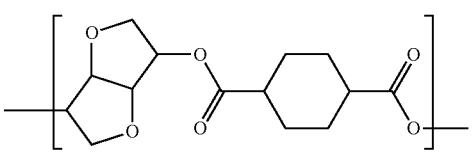
[Formula 2]

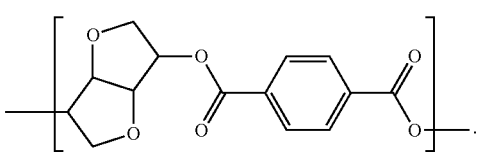
[Formula 3]

The repeat units represented by the above Formulae 1 to 3 may be selected in various combinations depending on the physical properties of the desired eyeglass frames.

Specifically, the polycarbonate ester resin may comprise the repeat unit 1 represented by the above Formula 1 and the repeat unit 2 represented by the above Formula 2.

The polycarbonate ester resin may comprise the repeat unit 1 represented by the above Formula 1 and the repeat unit 3 represented by the above Formula 3.

The polycarbonate ester resin may comprise the repeat unit 1 represented by the above Formula 1, the repeat unit 2 represented by the above Formula 2, and the repeat unit 3 represented by the above Formula 3.

The repeat unit 1 may be obtained from the reaction of 1,4:3,6-dianhydrohexitol and a carbonate, the repeat unit 2 may be obtained from the reaction of 1,4:3,6-dianhydrohexitol and 1,4-cyclohexanedicarboxylate, and the repeat unit 3 may be obtained from the reaction of 1,4:3,6-dianhydrohexitol and a terephthalate.

The cis/trans ratio of the 1,4-cyclohexanedicarboxylate moiety in the repeat unit 2 may be 1/99 to 99/1%, 20/80 to 80/20%, or 30/70 to 70/30%.

1,4:3,6-dianhydrohexitol may be isomannide, isosorbide, or isoidide. Specifically, it may be isosorbide.

When the mole fractions of the repeat units 1 to 3 are x, y, and z, respectively, x is a real number of greater than 0 up to 1, y and z are real numbers of 0 to 1, and x+y, x+z, or x+y+z is 1.

The polycarbonate ester resin may have a glass transition temperature (Tg) of 100 to 240° C., 110 to 220° C., or 120 to 200° C.

The polycarbonate ester resin may have an Izod notch impact strength according to ASTM D256 of 70 J/m or more, 100 J/m or more, 180 J/m or more, 190 J/m or more, 70 to 900 J/m, 70 to 850 J/m, 70 to 300 J/m, 100 to 900 J/m, 100 to 300 J/m, 200 to 900 J/m, 500 to 900 J/m, or 500 to 850 J/m.

The polycarbonate ester resin may have an intrinsic viscosity (IV) of 0.6 to 2.0 dl/g, 0.6 to 1.5 dl/g, or 0.6 to 1.0 dl/g.

The polycarbonate ester resin may have a tensile modulus according to ASTM D638 of 1,500 MPa or more, 2,000 MPa or more, 2,500 MPa or more, 1,500 to 4,000 MPa, 2,000 to 6,500 MPa, or 2,500 to 3,000 MPa.

The polycarbonate ester resin may have a light transmittance according to ASTM D1003 of 90% or more, or 92% or more.

The polycarbonate ester resin may have a pencil hardness of at least H according to KS M ISO15184.

Process for Preparing a Bio-Based Polycarbonate Ester Resin for Eyeglass Frames

Each of the repeat units represented by the above Formulae 1 to 3 may be obtained by subjecting each of the compounds represented by the following Formulae 4 to 6 and 1,4:3,6-dianhydrohexitol to a melt polycondensation reaction:

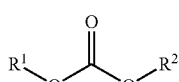
[Formula 4]

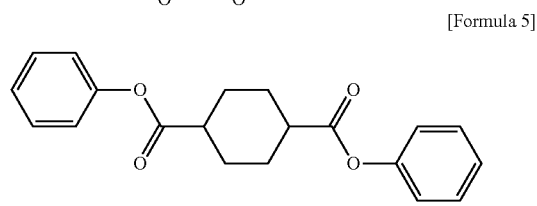
[Formula 5]

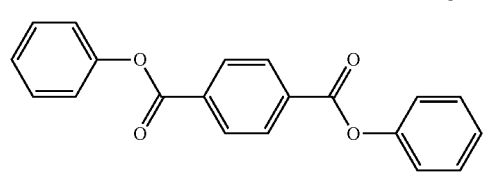
[Formula 6]

In the above Formula 4, $R^1$ and $R^2$ are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. In such event, the ester substituent may be an alkyl ester having 1 to 18 carbon atoms, a cycloalkyl ester having 4 to 20 carbon atoms, or an aryl ester having 6 to 18 carbon atoms.

The compound represented by the above Formula 4 may be dimethyl carbonate, diethyl carbonate, di-t-butyl carbonate, diphenyl carbonate, ditolyl carbonate, or bis(methylsalicyl) carbonate.

Specifically, since the melt polycondensation reaction is carried out under reduced pressures, diphenyl carbonate or substituted diphenyl carbonate may be used as the compound represented by the above Formula 4. The substituted diphenyl carbonate may be ditolyl carbonate or bis(methyl-salicyl) carbonate.

The compound represented by the above Formula 5 may be 1,4-diphenyl-cyclohexanedicarboxylate (DPCD).

The cis/trans ratio of the compound represented by the above Formula 5 may be 1/99 to 99/1%, 10/90 to 90/10%, or 20/80 to 80/20%.

The compound represented by the above Formula 6 may be diphenyl terephthalate (DPT).

1,4:3,6-dianhydrohexitol and the compound represented by the above Formula 4 may be reacted to form a carbonate bond (repeat unit 1, Formula 1), 1,4:3,6-dianhydrohexitol and the compound represented by the above Formula 5 may be reacted to form an ester bond (repeat unit 2, Formula 2), and 1,4:3,6-dianhydrohexitol and the compound represented by the above Formula 6 may be reacted to form an ester bond (repeat unit 3, Formula 3).

The total amount of the compound represented by the above Formula 4, the compound represented by the above Formula 5, and the compound represented by the above Formula 6, or a mixture thereof, may be 0.95 to 1.05% by mole, 0.9 to 1.1% by mole, or 0.7 to 1.3% by mole, based on 1 mole of 1,4:3,6-dianhydrohexitol.

Melt Polycondensation Reaction

The melt polycondensation reaction may be carried out with temperature elevation and depressurization in a stepwise manner in order to rapidly remove byproducts from the molten reactants having a high viscosity and to expedite the polymerization reaction.

Specifically, the melt polycondensation reaction may comprise (1) a first reaction at a reduced pressure of 50 to 700 torr and at a temperature of 130 to 250° C., 140 to 240° C., or 150 to 230° C. for 0.1 to 10 hours or 0.5 to 5 hours; and (2) a second reaction at a reduced pressure of 0.1 to 20 torr and at a temperature of 200 to 350° C., 220 to 280° C., or 230 to 270° C. for 0.1 to 10 hours or 0.5 to 5 hours.

More specifically, the melt polycondensation reaction may comprise (1) a first reaction under the conditions of raising the temperature to 130 to 200° C., followed by reducing the pressure to 200 to 700 torr, and raising the temperature to 200 to 250° C. at a rate of 0.1 to 10° C./min, followed by reducing the pressure to 50 to 180 torr; and (2) a second reaction under the conditions of reducing the pressure to 1 to 20 torr and raising the temperature to 200 to 350° C. at a rate of 0.1 to 5° C./min, followed by reducing the pressure to 0.1 to 1 torr.

Meanwhile, phenol may be produced as a reaction by-product during the melt polycondensation reaction.

It is preferable that phenol produced as a by-product is removed from the reaction system in order to shift the reaction equilibrium towards the production of the polycarbonate ester. If the rate of temperature elevation in the melt polycondensation reaction is within the above ranges, it is possible to prevent the problem that phenol, a reaction by-product, evaporates or sublimes together with the reaction raw materials.

In addition, the preparation of the polycarbonate ester may be carried out by a batch or continuous process.

For the preparation of a polycarbonate ester with high transparency, the melt polycondensation reaction using 1,4:3,6-dianhydrohexitol may be carried out at relatively low temperatures. In addition, in order to secure the mechanical properties of the polycarbonate ester thus prepared, it is preferable that the melt polycondensation reaction is carried out to a high degree of polymerization. For this purpose, it is effective to use a high viscosity polymerization reactor for the melt polycondensation reaction. The target viscosity of the melt polycondensation reaction may be 10,000 to 1,000,000 poises, 20,000 to 500,000 poises, or 30,000 to 300,000 poises.

Additional Diol Compound

The polycarbonate ester resin may further comprise a repeat unit obtained by using a diol compound other than 1,4:3,6-dianhydrohexitol.

The additional diol compound other than 1,4:3,6-dianhydrohexitol may be used in the melt polycondensation reaction. For example, the additional diol compound may be obtained from a bio-based raw material or a petroleum-based raw material, but the kind thereof is not limited.

The additional diol compound may be a primary, secondary, or tertiary diol compound.

Specifically, the additional diol compound may be at least one diol compound selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol (CHDM), tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, biphenol, 2,2-bis(4-hydroxyphenyl)propane, 2,2-bis(4-hydroxy-3,5-dimethylphenyl)propane, 2,2-bis(4-hydroxy-3,5-diethylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethyl-cyclohexane, 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl)sulfone, 1,3-bis[2-(4-hydroxyphenyl)-2-propyl]benzene, 2,2-bis(4-hydroxy-3-isopropyl-phenyl) propane, bis(4-hydroxyphenyl)methane, 1,1-bis(4-hydroxyphenyl)ethane, bis(4-hydroxyphenyl)-2,2-dichloroethylene, 2,2-bis(3-methyl-4-hydroxyphenyl) propane, bis(4-hydroxyphenyl)diphenylmethane, 2,2-bis(4-hydroxyphenyl)butane, 2,2-bis(4-hydroxyphenyl) hexafluoropropane, 3,3'-spiro-bis(1,1-dimethyl-2,3-dihydro-1H-inden-5-ol, and diols obtainable from a bio-based raw material such as 5,5'-(1-methylethylidene)bis(2-furanmethanol, 2,4:3,5-di-o-methylene-D-mannitol, and tetrahydrofuran-2,5-dimethanol.

More specifically, the additional diol compound may be 1,14-tetradecanediol, 1,4-cyclohexanedimethanol, 2,2-bis (4-hydroxycyclohexyl)propane, 2,2,4,4-tetramethyl-1,3-cyclobutanediol, or tetrahydrofuran-2,5-dimethanol.

If the polycarbonate ester resin comprises the additional diol compound, 1,4:3,6-dianhydrohexitol may be used in an amount of at least 1% by mole based on 100% by mole of the total amount of the diol compounds.

Specifically, when the molar ratio of the additional diol compound employed is q, the molar ratio of 1,4:3,6-dianhydrohexitol employed is to be 1-q. In particular, if the additional diol compound is a petrochemical-based diol compound, it may be used in an amount such that the bio-based carbon content (ASTM-D6866) in the final polymer derived from 1,4:3,6-dianhydrohexitol is at least 1% by mole. In such event, q may satisfy 0<q≤0.99. That is, the additional diol compound may be used in an amount of at most 99% by mole based on 100% by mole of the total amount of the diol compounds.

Additional Diphenyl Ester Compound

The polycarbonate ester resin may further comprise a repeat unit obtained by using an additional diphenyl ester compound, depending on the target properties.

For example, the additional diphenyl ester compound may be obtained from a bio-based raw material or a petroleum-based raw material, but the kind thereof is not limited.

When the molar ratio of the additional diphenyl ester compound employed is p, the molar ratio of the compound represented by the above Formula 4 and the compound represented by the above Formula 5 and/or Formula 6 employed is to be 1-p. In such event, p may satisfy 0≤p<1.

The additional diphenyl ester compound may be prepared by reacting a primary, secondary, or tertiary dicarboxylate or dicarboxylic acid (hereinafter, additional dicarboxylate or dicarboxylic acid) with phenol or a phenol substituent.

The additional ester compound may be at least one selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene-2,4-dicarboxylate, diphenyldecahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl-ethylidenebisbenzoate, 4,4'-diphenyl-oxybisbenzoate, 1,4-diphenyl-naphthalenedicarboxylate, 1,5-diphenyl-naphthalenedicarboxylate, 2,6-diphenyl-naphthalenedicarboxylate, and 2,5-diphenyl-furandicarboxylate.

The additional diphenyl ester compound may be diphenyl tetrahydrofuran-2,5-dicarboxylate or diphenyl decahydronaphthalene-2,6-dicarboxylate.

Catalyst for the Melt Polycondensation Reaction and Additives

In the above melt polycondensation reaction, a catalyst may be used for enhancing the reactivity of the reaction. In addition, the catalyst may be added to the reaction step at any time, but it is preferably added before the reaction.

Any alkali metal and/or alkali earth metal catalyst commonly used in a polycarbonate melt polycondensation reaction may be used as the catalyst. In addition, an oxide, hydride, amide, or phenolate of an alkali metal and/or an alkaline earth metal may be used as the catalyst.

Examples of the alkali metal catalysts may include lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), cesium acetate (CsOAc), and the like.

Examples of the alkali earth metal catalysts may include calcium hydroxide ($Ca(OH)_2$), barium hydroxide ($Ba(OH)_2$), magnesium hydroxide ($Mg(OH)_2$), strontium hydroxide ($Sr(OH)_2$), calcium carbonate ($CaCO_3$), barium carbonate ($BaCO_3$), magnesium carbonate ($MgCO_3$), strontium carbonate ($SrCO_3$), calcium acetate ($Ca(OAc)_2$), barium acetate ($Ba(OAc)_2$), magnesium acetate ($Mg(OAc)_2$), strontium acetate ($Sr(OAc)_2$), and the like.

Examples of the alkali metal and/or alkaline earth metal oxide may include magnesium oxide (MgO), barium oxide (BaO), sodium aluminate ($NaAlO_2$), zinc oxide (ZnO), lead oxide (PbO), dibutyltin oxide (($C_4H_9)_2SnO$), antimony trioxide ($Sb_2O_3$), and the like.

The catalyst may be used in an amount of greater than 0 to 5 mmole, greater than 0 to 3 mmole, or greater than 0 to 1 mmole per 1 mole of the total diol compounds. If the amount of the catalyst is within the above range, it is possible to prevent the problems that the degree of polymerization falls below the target degree of polymerization and that a side reaction takes place whereby the transparency of the polymer impaired.

Meanwhile, the alkali metal and/or alkaline earth metal catalyst may be used in combination with a basic catalyst such as a basic ammonium or amine, a basic phosphorous, or a basic boron compound. The basic catalyst may be used alone or in combination, and the amount thereof is not particularly limited.

In addition, such additives as an antioxidant, a heat stabilizer, a light absorber, a color protecting agent, a lubricant, a colorant, a nucleating agent, a flame retardant, a conductive agent, a plasticizer, and an antistatic agent may be further used in the melt polycondensation reaction, as required.

Examples of the antioxidant include hindered phenol, hydroquinone, phosphite, and a substituted compound thereof.

Examples of the light absorber include resorcinol, salicylate, and the like.

Examples of the lubricant include phosphite, hydrophosphite, and the like, and examples of the color protecting agent include montanic acid, stearyl alcohol, and the like.

A dye or a pigment may be used as a colorant, and carbon black may be used as a conductive agent, a colorant, or a nucleation agent.

The types and amounts of the aforementioned additives are not particularly limited as long as they do not adversely affect the properties, especially transparency, of the polycarbonate ester thus prepared.

The present invention provides a molded article prepared from the polycarbonate ester resin. The molded article may be prepared by molding the polycarbonate ester resin by various molding methods such as injection molding, extrusion molding, blow molding, and profile extrusion molding, and post-processing such as thermoforming using the same. The specific shape and size of the molded article may be variously determined depending on the application, and examples thereof are not particularly limited.

Further, the present invention provides an eyeglass frame, which comprises the molded article.

Here, the eyeglass frame may further comprise a metal, a pigment, and the like. The metal and the pigment are not particularly limited as long as they are commonly used in the field of manufacturing eyeglass frames, and examples thereof are not particularly limited.

As described above in detail, the bio-based polycarbonate ester resin for eyeglass frames of the present invention is environmentally friendly since it is free from bisphenols and is excellent in heat resistance, transparency, strength, hardness, dimensional stability, and chemical resistance. In addition, it is possible to paint and coat it in various colors in the post-processing, and no additional additives are required in the molding process. Accordingly, the polycarbonate ester resin may be molded through a series of steps to produce an eyeglass frame. Further, the production cost can be reduced since the polycarbonate ester is processed at low temperatures as compared with the conventional plastic materials for eyeglass frames.

Mode for the Invention

Hereinafter, the present invention will be described in more detail with reference to the following examples. However, these examples are set forth to illustrate the present invention, and the scope of the present invention is not limited thereto.

[EXAMPLE] PREPARATION OF A BIO-BASED POLYCARBONATE ESTER RESIN

Example 1

A 17-liter polycondensation bench reactor was charged with 2,002 g (13.70 moles) of isosorbide (ISB; Roquette Freres), 2,348 g (10.96 moles) of diphenyl carbonate (DPC; Changfeng), 889 g (2.74 moles) of 1,4-diphenyl-cyclohexane dicarboxylate (DPCD; SK Chemical Co.), and 2 g of a 1% aqueous solution of sodium aluminate ($NaAlO_2$). The mixture was heated to 150° C. Once the temperature reached 150° C., the pressure was reduced to 400 torr, and the temperature was then elevated to 190° C. over 1 hour. At that time, phenol, which is a by-product of the polymerization reaction performed, was discharged from the reactor. When the temperature reached 190° C., the pressure was reduced to 100 torr and maintained for 20 minutes, and then the temperature was elevated to 230° C. over 20 minutes. Once the temperature reached 230° C., the pressure was reduced to 10 torr, and then the temperature was elevated to 250° C. over 10 minutes. The pressure was reduced to 1 torr or less at 250° C., and the reaction continued until the target stirring torque was reached. Upon arrival at the target stirring torque, the reaction was terminated. The polymerized product was pressurized to be discharged as a strand, which was rapidly cooled in a water bath and then cut into pellets. The polycarbonate ester resin thus prepared had a glass transition temperature (Tg) of 157° C., an intrinsic viscosity (IV) of 0.84 dl/g, and a bio-based carbon content of 61%.

Examples 2 to 6

Each polycarbonate ester resin was prepared in the same manner as in Example 1 except that the monomers and/or the contents were used as described in Table 1.

[COMPARATIVE EXAMPLE] PREPARATION OF A BIO-BASED POLYCARBONATE ESTER RESIN

Comparative Example 1

A 17-liter polycondensation bench reactor was charged with 1,401 g (9.59 moles) of ISB, 593 g (4.11 moles) of 1,4-cyclohexanedimethanol (CHDM; SK Chemical Co.), 2,935 g (13.70 moles) of DPC, and 2 g of a 1% aqueous solution of sodium aluminate ($NaAlO_2$). The mixture was heated to 150° C. Once the temperature reached 150° C., the pressure was reduced to 400 torr, and the temperature was then elevated to 190° C. over 1 hour. At that time, phenol, which is a by-product of the polymerization reaction performed, was discharged from the reactor. When the temperature reached 190° C., the pressure was reduced to 100 torr and maintained for 20 minutes, and then the temperature was elevated to 230° C. over 20 minutes. Once the temperature reached 230° C., the pressure was reduced to 10 torr, and then the temperature was elevated to 250° C. over 10 minutes. The pressure was reduced to 1 torr or less at 250° C., and the reaction continued until the target stirring torque was reached. Upon arrival at the target stirring torque, the reaction was terminated. The polymerized product was pressurized to be discharged as a strand, which was rapidly cooled in a water bath and then cut into pellets. The polycarbonate ester resin thus prepared had a Tg of 124° C., an IV of 0.83 dl/g, and a bio-based carbon content of 55%.

Comparative Example 2

A polycarbonate ester resin was prepared in the same manner as in Comparative Example 1 except that the monomers and/or the contents were used as described in Table 1.

EVALUATION EXAMPLE

The polycarbonate ester resins or polycarbonate resins of Examples 1 to 6 and Comparative Examples 1 and 2 were each evaluated for their physical properties by the following methods. The measured physical properties are shown in Table 1 below.

(1) Glass Transition Temperature (Tg)

The glass transition temperature was measured using a differential scanning calorimeter (Q20, TA Instruments) in accordance with ASTM D3418.

(2) Bio-Based Carbon Content

The bio-based carbon content (%) was measured using an accelerator mass spectroscopy (Beta Analytic Co.) according to ASTM D6866-16.

(3) Intrinsic Viscosity (IV)

A sample was dissolved in o-chlorophenol at a concentration of 1.2 g/dl at 150° C. for 15 minutes. The intrinsic viscosity of the sample was measured in a thermostat at 35° C. using an Ubbelohde viscometer.

(4) Tensile Modulus

A specimen prepared according to ASTM D638 was subjected to a measurement using a universal testing machine (Z010, Zwick Roell).

(5) Izod Notch Impact Strength

A specimen prepared according to ASTM D256 was subjected to a measurement for Izod impact strength using an impact tester (258-PC-S, Yasuda).

(6) Light Transmittance

The light transmittance (%) was measured using a spectrophotometer (CM-3600A, Konica Minolta) in accordance with ASTM D1003.

(7) Pencil Hardness

A specimen prepared according to KS M ISO15184 was subjected to a measurement for pencil hardness using a pencil hardness testing machine (VF2377-123, TQC).

TABLE 1

| Item | | Ex. 1 | Ex. 2 | Ex. 3 | Ex. 4 | Ex. 5 | Ex. 6 | C. Ex. 1 | C. Ex. 2 |
|---|---|---|---|---|---|---|---|---|---|
| Composition (molar ratio) | ISB | 1 | 1 | 1 | 1 | 1 | 0.9 | 0.7 | 0.5 |
| | CHDM | — | — | — | — | — | 0.1 | 0.3 | 0.5 |
| | DPC | 0.8 | 0.7 | 0.6 | 0.9 | 0.6 | 0.9 | 1 | 1 |
| | DPCD | 0.2 | 0.3 | 0.4 | — | 0.2 | 0.1 | — | — |
| | DPT | — | — | — | 0.1 | 0.2 | — | — | — |
| Physical property | Tg (° C.) | 157 | 154 | 151 | 170 | 172 | 150 | 124 | 104 |
| | IV (dl/g) | 0.82 | 0.85 | 0.87 | 0.80 | 0.83 | 0.84 | 0.83 | 0.88 |
| | BCC (%) | 71 | 66 | 61 | 77 | 61 | 68 | 55 | 38 |
| | TM (MPa) | 2,980 | 2,860 | 2,770 | 2,940 | 2,890 | 2,550 | 2,520 | 2,230 |
| | INIS (J/m) | 192 | 675 | 828 | 84 | 756 | 278 | 187 | 785 |
| | LT (%) | 92 | 92 | 92 | 92 | 92 | 92 | 92 | 92 |
| | PH | 2H | 2H | H | 2H | H | H | F | HB |

* BCC: bio-based carbon content; TM: tensile modulus; INIS: Izod notch impact strength; LT: light transmittance; PH: pencil hardness As shown in Table 1, the bio-based polycarbonate ester resins of Examples 1 to 6 had high values of bio-based carbon content, glass transition temperature (or heat resistance), tensile modulus, and/or impact strength as compared with the materials prepared in Comparative Examples 1 and 2.

Specifically, the impact strength was increased as the DPCD content was increased in Examples 1 to 3, and the glass transition temperature was greatly increased when DPT or DPCD was used together with DPT in Examples 4 and 5. In addition, in Example 6 in which DPCD and CHDM were used, the glass transition temperature was relatively low, but the physical properties in terms of tensile modulus, impact strength, light transmittance, and hardness were suitable for eyeglass frames.

In addition, the light transmittances in Examples 1 to 6 were all 92%, which was superior to the light transmittance of 91% of plastic materials for eyeglass frames made of polyamide. Further, the pencil hardness was all H or higher, which was suitable for use as an eyeglass frame.

Meanwhile, the bio-based polycarbonate esters prepared from CHDM in Comparative Examples 1 and 2 had low glass transition temperatures as compared with the Examples. Thus, they are not suitable for an eyeglass frame that requires various post-processing steps. The pencil hardness was also low. In particular, in Comparative Example 2, the impact strength was increased as the CHDM content was increased, but the bio-based carbon content was decreased.

In sum, it is possible to adjust the advantages and disadvantages of the properties obtained from the repeat units by controlling the contents of 1,4-diphenyl-cyclohexanedicarboxylate, diphenyl terephthalate, and 1,4-cyclohexanedimethanol, depending on the physical properties required for eyeglass frames. The bio-based polycarbonate ester resin thus prepared has a high bio-based carbon content and is excellent in heat resistance, transparency, and strength. Thus, it can be used as a variety of eyeglass frames.

The invention claimed is:

1. A bio-based polycarbonate ester resin for eyeglass frames, which comprises
   (a) a repeat unit 1 of the following Formula 1;
   (b) any one of the following (i)-(iii):
      (i) repeat unit 2 of the following Formula 2,
      (ii) a repeat unit 3 of the following Formula 3, or
      (iii) the repeat unit 2 of the following Formula 2 and the repeat unit 3 of the following Formula 3

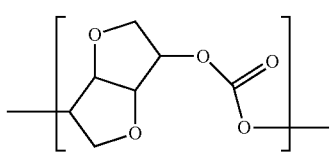
[Formula 1]

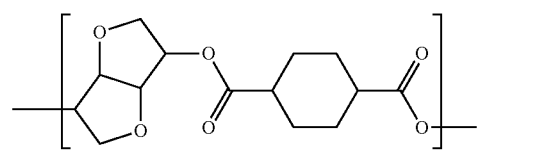
[Formula 2]

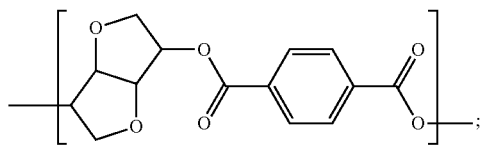
[Formula 3]

and
   wherein the bio-based polycarbonate ester resin has an Izod notch impact strength according to ASTM D256 of 70 J/m or more.

2. The bio-based polycarbonate ester resin of claim 1, which comprises the repeat unit 1 of the Formula 1 and the repeat unit 2 of the Formula 2.

3. The bio-based polycarbonate ester resin of claim 1, which comprises the repeat unit 1 of the Formula 1 and the repeat unit 3 of the Formula 3.

4. The bio-based polycarbonate ester resin of claim 1, which comprises the repeat unit 1 of the Formula 1, the repeat unit 2 of the Formula 2, and the repeat unit 3 of the Formula 3.

5. The bio-based polycarbonate ester resin of claim 1, wherein the repeat unit 1 is obtained from a reaction of 1,4:3,6-dianhydrohexitol and a carbonate,
   the repeat unit 2 is obtained from a reaction of 1,4:3,6-dianhydrohexitol and 1,4-cyclohexanedicarboxylate, and
   the repeat unit 3 is obtained from a reaction of 1,4:3,6-dianhydrohexitol and a terephthalate.

6. The bio-based polycarbonate ester resin of claim 1, wherein each of the repeat units of the Formulae 1 to 3 is obtained by subjecting each of the compounds of the following Formulae 4 to 6 and 1,4:3,6-dianhydrohexitol to a melt polycondensation reaction:

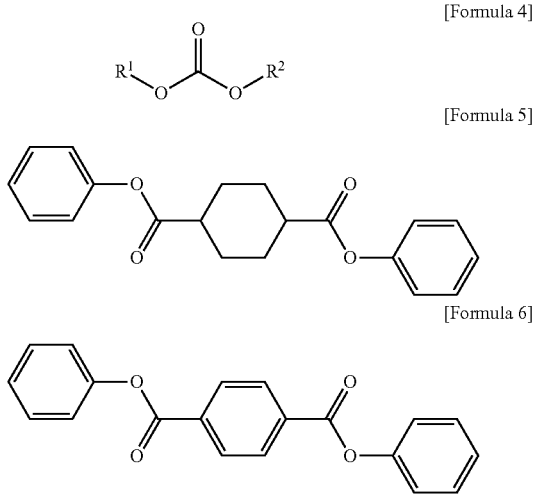

[Formula 4]

[Formula 5]

[Formula 6]

in the above Formula 4,

R[1] and R[2] are each an alkyl group having 1 to 18 carbon atoms or an aryl group having 6 to 18 carbon atoms, wherein the aryl group may have one or more substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent.

7. The bio-based polycarbonate ester resin of claim 1, which has an intrinsic viscosity (IV) of 0.6 to 1.5 dl/g.

8. The bio-based polycarbonate ester resin of claim 5, which further comprises a repeat unit obtained by using an additional diol compound other than 1,4:3,6-dianhydrohexitol.

9. The bio-based polycarbonate ester resin of claim 8, wherein the additional diol compound is one or more diol compound selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol (CHDM), tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, biphenol, 2,2-bis(4-hydroxyphenyl)propane, 2,2-bis(4-hydroxy-3,5-dimethylphenyl)propane, 2,2-bis(4-hydroxy-3,5-diethylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethyl-cyclohexane, 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl) sulfone, 1,3-bis[2-(4-hydroxyphenyl)-2-propyl]benzene, 2,2-bis(4-hydroxy-3-isopropyl-phenyl)propane, bis(4-hydroxyphenyl)methane, 1,1-bis(4-hydroxyphenyl)ethane, bis (4-hydroxyphenyl)-2,2-dichloroethylene, 2,2-bis(3-methyl-4-hydroxyphenyl)propane, bis(4-hydroxyphenyl) diphenylmethane, 2,2-bis(4-hydroxyphenyl)butane, 2,2-bis(4-hydroxyphenyl)hexafluoropropane, 3,3'-spiro-bis(1,1-dimethyl-2,3-dihydro-1H-inden-5-ol, and a diol obtainable from 5,5'-(1-methylethylidene)bis(2-furanmethanol, 2,4:3,5-di-o-methylene-D-mannitol, tetrahydrofuran-2,5-dimethanol, or mixtures thereof.

10. The bio-based polycarbonate ester resin of claim 6, which further comprises a repeat unit obtained by using an additional ester compound selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene-2,4-dicarboxylate, diphenyl decahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl -ethylidenebisbenzoate, 4,4'-diphenyl-oxybisbenzoate, 1,4-diphenyl-naphthalenedicarboxylate, 1,5-diphenyl -naphthalenedicarboxylate, 2,6-diphenyl-naphthalenedicarboxylate, and 2,5-diphenyl -furandicarboxylate, and mixtures thereof.

11. The bio-based polycarbonate ester resin of claim 1, which has a glass transition temperature (Tg) of 100 to 240° C.

12. The bio-based polycarbonate ester resin of claim 1, which has a tensile modulus according to ASTM D638 of 1,500 MPa or more.

13. A molded article prepared from the polycarbonate ester resin of claim 1.

14. An eyeglass frame, which comprises the molded article of claim 13.

15. The bio-based polycarbonate ester resin of claim 6, which further comprises a repeat unit obtained by using an additional diol compound other than 1,4:3,6-dianhydrohexitol.

16. The bio-based polycarbonate ester resin of claim 15, wherein the additional diol compound is one or more diol compound selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol (CHDM), tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, biphenol, 2,2-bis(4-hydroxyphenyl)propane, 2,2-bis(4-hydroxy-3,5-dimethylphenyl)propane, 2,2-bis(4-hydroxy-3,5-diethylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethyl-cyclohexane, 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl)sulfone, 1,3-bis[2-(4-hydroxyphenyl)-2-propyl]benzene, 2,2-bis(4-hydroxy-3-isopropyl-phenyl)propane, bis(4-hydroxyphenyl)methane, 1,1-bis(4-hydroxyphenyl)ethane, bis(4-hydroxyphenyl)-2,2-dichloroethylene, 2,2-bis(3-methyl-4-hydroxyphenyl)propane, bis(4-hydroxyphenyl)diphenylmethane, 2,2-bis(4-hydroxyphenyl)butane, 2,2-bis(4-hydroxyphenyl)hexafluoropropane, 3,3'-spiro-bis(1,1-dimethyl-2,3-dihydro-1H-inden-5-ol, and a diol obtainable from 5,5'-(1-methylethylidene)bis(2-furanmethanol, 2,4:3,5-di-o-methylene-D-mannitol, tetrahydrofuran-2,5-dimethanol, or mixtures thereof.

\* \* \* \* \*